United States Patent
Sato et al.

(10) Patent No.: US 9,312,931 B2
(45) Date of Patent: *Apr. 12, 2016

(54) RADIO BASE STATION, RADIO TERMINAL, AND COMMUNICATION CONTROL METHOD

(75) Inventors: Yoshizo Sato, Yawata (JP); Nobuaki Takamatsu, Koto-ku (JP); Masahiro Yagi, Kyoto (JP); Hiroki Fujita, Yokohama (JP); Masaaki Nakata, Yamato (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/819,667

(22) PCT Filed: Aug. 26, 2011

(86) PCT No.: PCT/JP2011/069358
§ 371 (c)(1),
(2), (4) Date: Mar. 28, 2013

(87) PCT Pub. No.: WO2012/026604
PCT Pub. Date: Mar. 1, 2012

(65) Prior Publication Data
US 2013/0225186 A1    Aug. 29, 2013

(30) Foreign Application Priority Data
Aug. 27, 2010  (JP) ................................ 2010-191346
Aug. 27, 2010  (JP) ................................ 2010-191349

(51) Int. Cl.
H04W 72/12    (2009.01)
H04B 7/04     (2006.01)
(Continued)

(52) U.S. Cl.
CPC ............... *H04B 7/04* (2013.01); *H04L 5/0023* (2013.01); *H04L 5/0048* (2013.01); *H04W 72/12* (2013.01);
(Continued)

(58) Field of Classification Search
CPC ............ H04W 72/12; H04W 72/1205; H04W 72/1226; H04W 72/1231
USPC ......................................... 455/450
See application file for complete search history.

(56) References Cited

U.S. PATENT DOCUMENTS

| | | | |
|---|---|---|---|
| 8,503,389 B2 * | 8/2013 | Tanaka et al. | 370/330 |
| 2008/0232325 A1 * | 9/2008 | Mehta et al. | 370/332 |

(Continued)

FOREIGN PATENT DOCUMENTS

| | | |
|---|---|---|
| JP | 2008-211686 A | 9/2008 |
| JP | 2009-060595 A | 3/2009 |

(Continued)

OTHER PUBLICATIONS
International Search Report; PCT/JP2011/069358; Nov. 22, 2011.
(Continued)

*Primary Examiner* — Asghar Bilgrami
(74) *Attorney, Agent, or Firm* — Studebaker & Brackett PC

(57) ABSTRACT

In a case where, although a radio base station (eNB 1-1) has established an SRS transmission frequency band, a serving radio terminal (UE 2-1) has transmitted, to the radio base station (eNB 1-1), an SRS by use of only a frequency band that is a part of the SRS transmission frequency band, the radio base station (eNB 1-1) allocates a downstream resource block the frequency band of which is included in the SRS transmission frequency band and further the frequency band of which is identical with the frequency band of the SRS received at the latest; then establishes, for the downstream resource block, a transmission weight based on the SRS received at the latest; and then uses the downstream resource block to transmit a radio signal.

9 Claims, 10 Drawing Sheets

(51) Int. Cl.
*H04L 5/00* (2006.01)
*H04W 88/08* (2009.01)
*H04B 7/06* (2006.01)
*H04W 52/42* (2009.01)

(52) U.S. Cl.
CPC ...... *H04W 72/1205* (2013.01); *H04W 72/1226* (2013.01); *H04W 72/1231* (2013.01); *H04W 88/08* (2013.01); *H04B 7/0615* (2013.01); *H04W 52/42* (2013.01)

(56) References Cited

U.S. PATENT DOCUMENTS

| | | | |
|---|---|---|---|
| 2009/0042615 A1 | 2/2009 | Teo et al. | |
| 2009/0247229 A1* | 10/2009 | Teo et al. | 455/562.1 |
| 2009/0316675 A1 | 12/2009 | Malladi et al. | |
| 2011/0171964 A1* | 7/2011 | Lin et al. | 455/450 |
| 2012/0178502 A1 | 7/2012 | Teo et al. | |

FOREIGN PATENT DOCUMENTS

| | | |
|---|---|---|
| JP | 2010-506543 A | 2/2010 |
| JP | 2010-109648 A | 5/2010 |

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8).

An Office Action; "Notice of Reasons for Rejection," issued by the Japanese Patent Office on Apr. 8, 2014, which corresponds to Japanese Patent Application No. 2012-530750 and is related to U.S. Appl. No. 13/819,667; with English language statement of relevance.

* cited by examiner

RADIO BASE STATION, RADIO TERMINAL, AND COMMUNICATION CONTROL METHOD

TECHNICAL FIELD

The present invention relates to a radio base station that transmits and receives a radio signal to and from a radio terminal using a plurality of antennas, and a communication control method in the radio base station. Furthermore, the present invention relates to a radio terminal that performs radio communication with a radio base station of an adaptive array scheme applying an antenna weight to a plurality of antennas, and a communication control method in such a radio terminal.

BACKGROUND ART

In 3GPP (Third Generation Partnership Project), in a radio communication system corresponding to LTE (Long term Evolution), for which the standards are being set up currently, a radio base station eNB assigns a radio resource in the radio communication between the radio base station eNB and a radio terminal UE (for example, see Non Patent Literature 1). Furthermore, in a radio communication system corresponding to LTE, either Frequency Division Duplex (FDD) or Time Division Duplex (TDD) is employed in the radio communication between the radio base station eNB and the radio terminal UE. Moreover, in an LTE (TDD-LTE) radio communication system employing the TDD, there has been discussed a feature where a radio base station eNB performs control for adaptively directing a beam (adaptive array control) toward the radio terminal UE at the time of transmission of a downlink radio signal, in order to ensure communication quality between the radio base station eNB and a radio terminal UE that is moving.

According to a technique of calculating the antenna weight, when a radio base station eNB receives a sounding reference signal (SRS), which is an uplink radio signal from a radio terminal UE, it is considered that the radio base station eNB calculates an antenna weight for a downlink resource block that has a frequency band equal to a frequency band of the SRS. In such a case, the radio base station eNB notifies the frequency band (SRS transmission frequency band) used in the transmission of SRS to the radio terminal UE.

However, because the radio terminal UE exists on an outer edge of a cell, in cases where the power consumption increases when SRS is transmitted by using an entire broad SRS transmission frequency band, the SRS is sometimes transmitted by using only a part of the SRS transmission frequency band. Under such a situation, the radio base station eNB cannot accurately set the antenna weight for a downlink resource block in the entire notified SRS transmission frequency band.

Furthermore, because the SRS transmission frequency band is wide, the radio terminal UE may exceed the upper limit of the transmission power. Under such a situation, the radio terminal UE is forced to reduce the transmission power, the certainty of arrival of SRS to the radio base station eNB deteriorates.

In view of the above problem, a first object of the present invention is to provide a radio base station and a communication control method, by which it is possible to accurately set an antenna weight for a downlink radio resource. Furthermore, a second object of the present invention is to provide a radio terminal and a communication control method by which the certainty of arrival of a reference signal to a radio base station is improved.

CITATION LIST

Non Patent Literature

[Non Patent Literature 1] 3GPP TS 36.211 V8.7.0" Physical Channels and Modulation", MAY 2009

SUMMARY OF INVENTION

To achieve the first object described above, the present invention has following features. A first feature of the present invention is a radio base station (radio base station eNB 1-1) of an adaptive array scheme applying an antenna weight to a plurality of antennas (antenna 108A, antenna 108B, antenna 108C, antenna 108D), comprising: a control unit (control unit 102) that sets a reference signal transmission frequency band available in a transmission of a reference signal (SRS) from a serving radio terminal, the reference signal being referenced in the calculation of the antenna weight, and that also assigns a radio resource of the set reference signal transmission frequency band to the serving radio terminal, wherein the control unit sets an antenna weight for a radio resource having a frequency band of a reference signal received most recently, from among the radio resources of the reference signal transmission frequency band, based on the reference signal received most recently.

Regardless of setting a reference signal transmission frequency band, if a serving radio terminal transmits a reference signal by using only a part of the reference signal transmission frequency band, then the radio base station sets an antenna weight based on the reference signal, to a radio resource having a frequency band of the reference signal received most recently, out of the reference-signal frequency band, and also transmits the radio signal using the radio resource having the frequency band of the reference signal. When an antenna weight for a radio resource having a frequency band of a reference signal is set based on the reference signal, the setting of the antenna weight can be performed accurately.

A second feature of the present invention is summarized as that the control unit sets the antenna weight so that a desired wave direction of a beam having a frequency band of the reference signal, from the reference signal transmission frequency band, is directed towards the serving radio terminal.

A third feature of the present invention is summarized as that the control unit sets a non-directional antenna weight for the radio resource having a frequency band other than the frequency band of the reference signal, from the reference signal transmission frequency band.

A fourth feature of the present invention is summarized as that the control unit sets the antenna weight so that a desired wave direction of a beam having a frequency band of the reference signal received within a predetermined time period, from the reference signal transmission frequency band, is directed towards the serving radio terminal.

A fifth feature of the present invention is summarized as that the control unit switches the reference signal transmission frequency band, at each timing of setting.

A sixth feature of the present invention is summarized as a communication control method in a radio base station of an adaptive array scheme applying an antenna weight to a plurality of antennas, comprising: a control step of setting a reference signal transmission frequency band available in a transmission of a reference signal from a serving radio terminal, the reference signal being referenced in the calculation of the antenna weight, and of assigning a radio resource of the set reference signal transmission frequency band to the serving radio terminal, wherein the control step includes a step of setting an antenna weight for a radio resource having a frequency band of a reference signal received most recently, from among the radio resources of the reference signal transmission frequency band, based on the reference signal received most recently.

To achieve the second object described above, the present invention has following features. A seventh feature of the present invention is summarized as a radio terminal (serving radio terminal UE 2-1) that performs radio communication with a radio base station (radio base station eNB 1-1) of an adaptive array scheme applying an antenna weight to a plurality of antennas, comprising: a reception unit (control unit 202, radio communication unit 206, modulation and demodulation unit 207, antenna 208A, antenna 208B, antenna 208C, antenna 208D) that receives information on a first reference signal transmission frequency band available in a transmission of a reference signal referenced in the calculation of the antenna weight, and a control unit (control unit 202) that sets a second reference signal transmission frequency band included in the first reference signal transmission frequency band, based on a communication quality with the radio base station, and transmits the reference signal using the second reference signal transmission frequency band.

If the transmission of a reference signal using a first reference signal transmission frequency band is requested by a radio base station, then based on the communication quality with the radio base station, such a radio terminal sets a second reference signal transmission frequency band included in the first reference signal transmission frequency band, and transmits the reference signal using the second reference signal transmission frequency band. Therefore, the transmission of a reference signal by the control of a reference signal transmission frequency band according to the communication quality with the radio base station is made possible, and the certainty of arrival of a reference signal to the radio base station is improved.

An eight feature of the present invention is summarized as that the control unit sets the second reference signal transmission frequency band in accordance with a transmission power of the radio terminal.

A ninth feature of the present invention is summarized as that the control unit narrows the second reference signal transmission frequency band when the transmission power control information requesting a control of the transmission power from the radio base station indicates a request for an increase of the transmission power, and either expands the second reference signal transmission frequency band or ends the process of narrowing of the second reference signal transmission frequency band when the transmission power control information requests a decrease in the transmission power.

A tenth feature of the present invention is summarized as a communication control method in a radio terminal that performs radio communication with a radio base station of an adaptive array scheme applying an antenna weight to a plurality of antennas, comprising: a step of receiving information on a first reference signal transmission frequency band available in a transmission of a reference signal referenced in the calculation of the antenna weight, and a step of setting a second reference signal transmission frequency band included in the first reference signal transmission frequency band, based on a communication quality with the radio base station, and then transmitting the reference signal using the second reference signal transmission frequency band.

DESCRIPTION OF EMBODIMENTS

Figure 1:
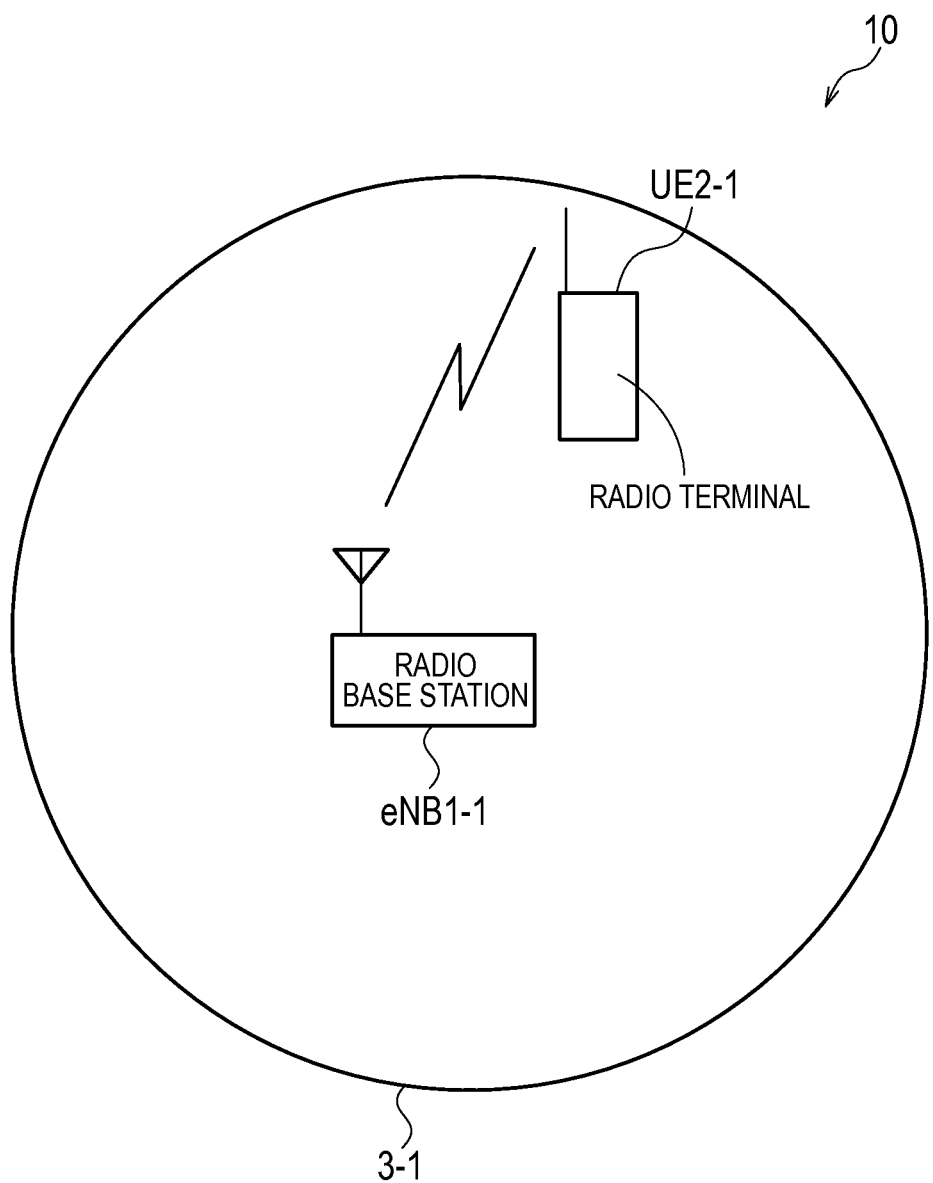
FIG. 1 is a diagram illustrating the entire schematic configuration of a radio communication system according to an embodiment of the present invention.

Next, an embodiment of the present invention will be described with reference to the drawings. Specifically, (1) Configuration of radio communication system, (2) Configuration of radio base station, (3) Configuration of radio terminal, (4) Operation of radio communication system, (5) Operation and effect, and (6) Other embodiments will be described. It is to be noted that the same or similar reference numerals are applied to the same or similar parts through the drawings in the following embodiments.

(1) Configuration of Radio Communication System

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes a radio base station eNB1-1 and a radio terminal UE2-1.

The radio terminal UE2-1 is a terminal to which a resource block is assigned by the radio base station eNB1-1. In this case, when the radio base station eNB1-1 is set as a reference, the radio terminal UE2-1 is the serving radio terminal. Hereinafter, the radio terminal, to which the resource block is assigned by the radio base station eNB1-1, will be appropriately referred to as a serving radio terminal UE2-1.

While Time Division Duplex is employed in the radio communication between the radio base station eNB1-1 and the radio terminal UE2-1, OFDMA (Orthogonal Frequency Division Multiplexing Access) is employed in the downlink radio communication, and SC-FDMA (Single Carrier Frequency Division Multiple Access) is employed in the uplink radio communication. Furthermore, downlink indicates a direction from the radio base station eNB1-1 to the radio terminal UE2-1. Uplink indicates a direction from the radio terminal UE2-1 to the radio base station eNB1-1.

The radio base station eNB1-1 assigns a resource block (RB) as a radio resource to the serving radio terminal UE2-1 in a cell 3-1.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 2:
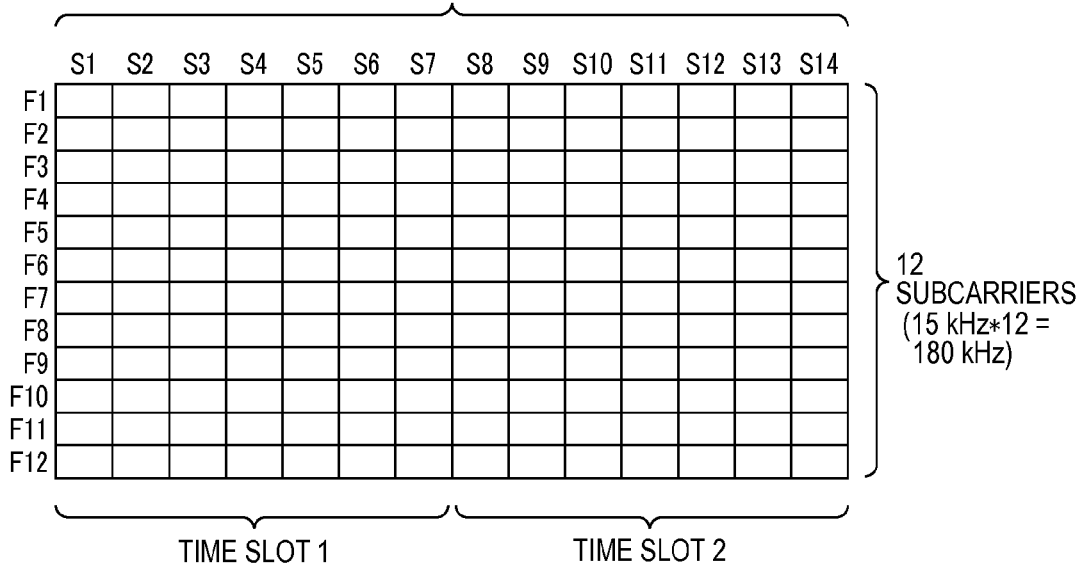
FIG. 2 is a diagram illustrating a format of a resource block according to the embodiment of the present invention.

FIG. 2 is a diagram illustrating a format of the resource block. The resource block is configured in one subframe having a time length of 1 [ms] in the time direction. The subframe includes a time period S1 to a time period S14. Among the time period S1 to the time period S14, the time period S1 to the time period S7 constitute a first half time slot (a time slot 1) and the time period S8 to the time period S14 constitute a latter half time slot (a time slot 2). Also, the time slot 1 and the time slot 2 correspond to the resource block.

As illustrated in FIG. 2, the resource block has a frequency width of 180 [kHz] in the frequency direction. Furthermore, the resource block includes 12 subcarriers F1 to F12 having a frequency width of 15 [kHz].

Figure 3:
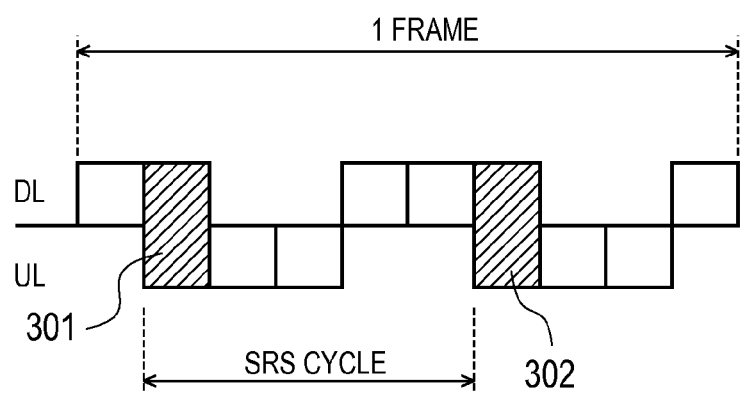
FIG. 3 is a diagram illustrating a format of a frame according to the embodiment of the present invention.

Furthermore, in the time direction, a plurality of subframes constitute one frame. FIG. 3 is a diagram illustrating a format of the frame. The frame illustrated in FIG. 3 includes 10 subframes. The frame includes 10 subframes in the sequence of a subframe of a downlink resource block, subframes (special subframes: SSF) of both the downlink resource block and an uplink resource block, a subframe of the uplink resource block, a subframe of the uplink resource block, a subframe of the downlink resource block, a subframe of the downlink resource block, a special subframe, a subframe of the uplink resource block, a subframe of the uplink resource block, and a subframe of the downlink resource block. Of the two special subframes included in one frame, the anterior special subframe is referred to as a first SSF301 and the posterior special subframe is referred to as a second SSF302. In the special subframes, within the subframe, the first half time slot is used for downlink radio communication and the latter half time slot is used for uplink radio communication across a guard time.

Furthermore, in the frequency direction, the entire frequency band of the radio resource available in the radio communication between the radio base station eNB1-1 and the radio terminal UE2-1, in other words, the frequency band that can be assigned to the serving radio terminal UE2-1 (assigned frequency band), has a bandwidth corresponding to the number of a plurality of resource blocks.

Figure 4:
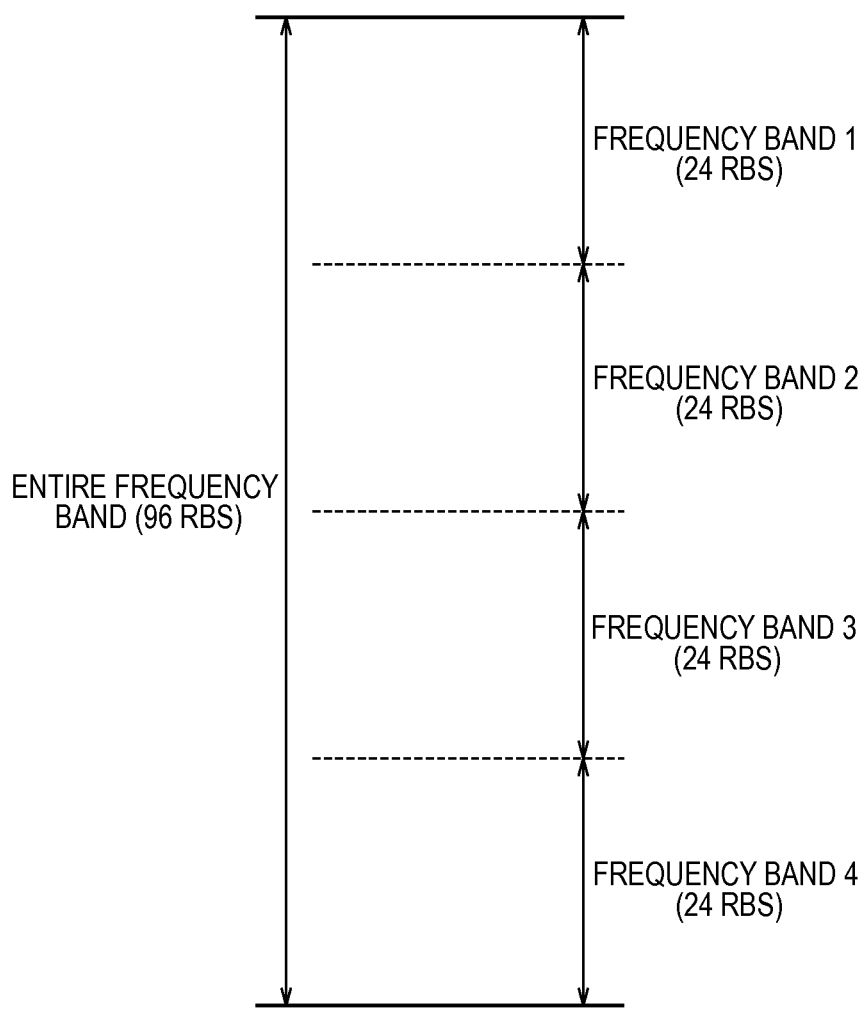
FIG. 4 is a diagram illustrating a configuration of a frequency band of a radio resource available in radio communication between a radio base station and a radio terminal according to the embodiment of the present invention.

FIG. 4 is a diagram illustrating a configuration of the entire frequency band available in the radio communication between the radio base station eNB1-1 and the serving radio terminal UE2-1. As illustrated in FIG. 4, the entire frequency band available in the radio communication between the radio base station eNB1-1 and the serving radio terminal UE2-1 has a bandwidth corresponding to 96 resource blocks. Furthermore, the entire frequency band is divided into a frequency band 1 to a frequency band 4, each of which has a bandwidth corresponding to 24 resource blocks.

The downlink resource block is configured by a control information channel (PDCCH: Physical Downlink Control CHannel) for downlink control information transmission and a shared data channel (PDSCH: Physical Downlink Shared CHannel) for downlink user data transmission, in the time direction.

On the other hand, in the uplink resource block, a control information channel (PUCCH: Physical Uplink Control CHannel) for uplink control information transmission is configured at both ends of the entire frequency band available in the uplink radio communication, and a shared data channel (PUSCH: Physical Uplink Shared CHannel) for uplink user data transmission is configured in the central part.

(2) Configuration of Radio Base Station

Figure 5:
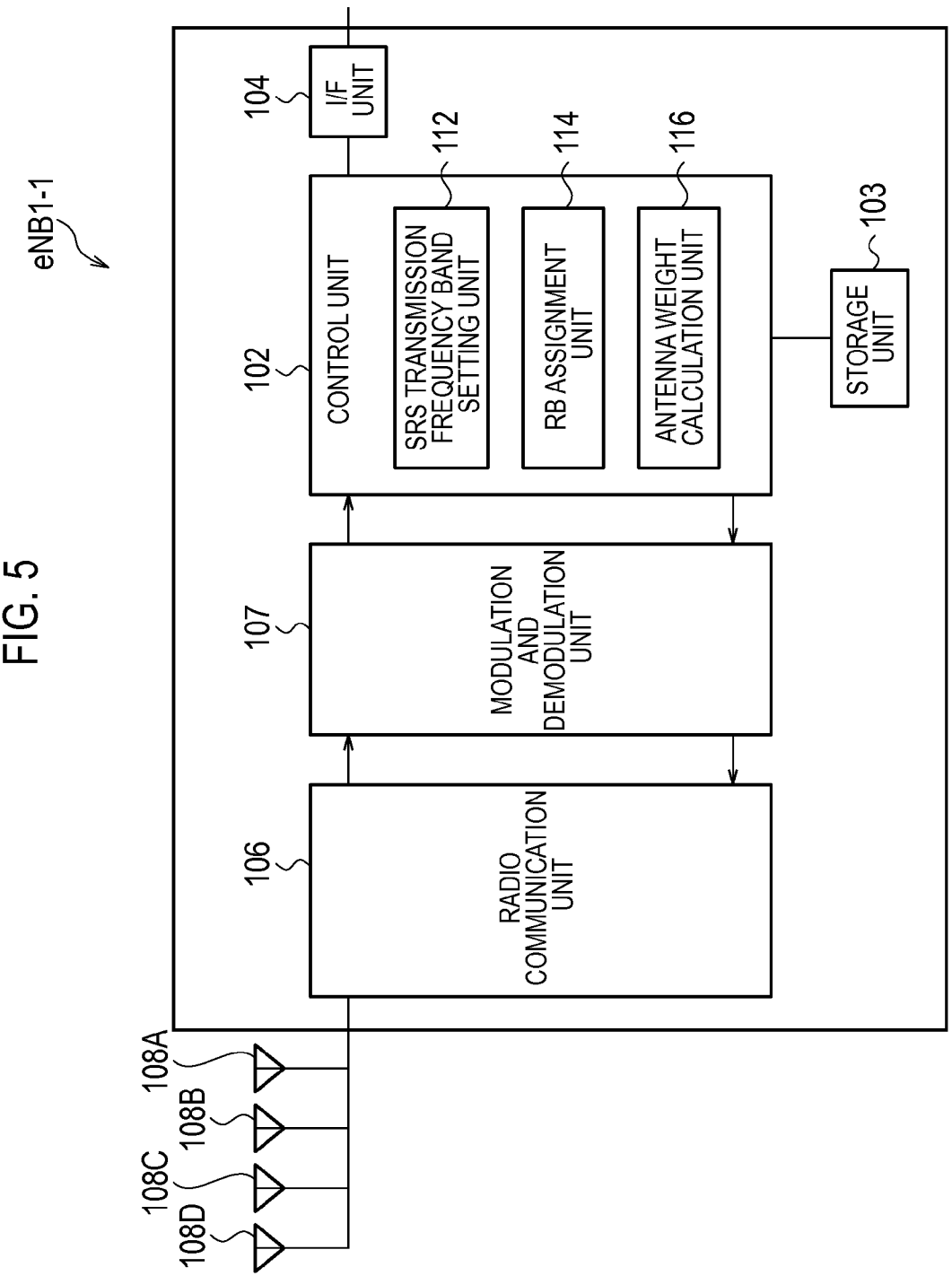
FIG. 5 is a configuration diagram of a radio base station according to the embodiment of the present invention.

FIG. 5 is a configuration diagram of the radio base station eNB1-1. As illustrated in FIG. 5, the radio base station eNB1-1 is a radio base station of an adaptive array scheme applying an antenna weight to a plurality of antennas, and includes a control unit 102, a storage unit 103, an I/F unit 104, a radio communication unit 106, a modulation and demodulation unit 107, an antenna 108A, an antenna 108B, an antenna 108C, and an antenna 108D.

The control unit 102, for example, is configured by a CPU, and controls various functions of the radio base station eNB1-1. The control unit 102 includes a sounding reference signal (SRS) transmission frequency band setting unit 112, a resource block (RB) assignment unit 114, and an antenna weight calculation unit 116. The storage unit 103, for example, is configured by a memory, and stores various types of information used for the control and the like of the radio base station eNB1-1.

The I/F unit 104 is able to communicate with another radio base station eNB through an X2 interface. Furthermore, the I/F unit 104 is able to communicate with EPC (Evolved Packet Core) that is not illustrated in the diagram, more specifically, with MME (Mobility Management Entity)/S-GW (Serving Gateway) through an S1 interface.

The radio communication unit 106 receives an uplink radio signal, which is transmitted from the serving radio terminal UE2-1, through the antenna 108A to the antenna 108D. Moreover, the radio communication unit 106 converts (down-converts) the received uplink radio signal to a baseband signal, and outputs the baseband signal to the modulation and demodulation unit 107.

The modulation and demodulation unit 107 performs demodulation and decoding processes for the input baseband signal. In this way, data included in the uplink radio signal transmitted from the radio terminal UE2-1 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the radio communication unit 106 transmits the downlink radio signal through the antenna 108A to the antenna 108D.

The SRS transmission frequency band setting unit 112 of the control unit 102 sets, to the serving radio terminal UE2-1, a frequency band (SRS transmission frequency band) that is used when the serving radio terminal UE2-1 transmits a sounding reference signal (SRS) at a timing of the special subframe. Furthermore, the SRS is a signal to be referred to in the calculation of an antenna weight in the radio base station eNB1-1, and is an uplink radio signal of a radio frequency band. In the present embodiment, when the SRS transmission frequency band setting unit 112 sets the SRS transmission frequency band during the transmission of the SRS by the serving radio terminal UE2-1 at the timing of the next special subframe, the SRS transmission frequency band is set before the timing of the special subframe is reached. In the present embodiment, the SRS transmission frequency band is switched in the sequence of the frequency band 1, the frequency band 3, the frequency band 2, and the frequency band 4 illustrated in FIG. 4, and then returns to the frequency band 1, in a so-called periodical switching sequence.

Each time the SRS transmission frequency band setting unit 112 sets an SRS transmission frequency band, the SRS transmission frequency band setting unit 112 transmits the information on the SRS transmission frequency band to the serving radio terminal UE2-1.

Specifically, the SRS transmission frequency band setting unit 112 sets a parameter corresponding to the bandwidth of the SRS transmission frequency band, in SoundingRS-UL-Config, that is, the information element of an RRC (Radio Resource Control) Connection Setup message. Furthermore, the SRS transmission frequency band setting unit 112 sets the information on a center frequency of the SRS transmission frequency band, in the RRC Connection Setup message.

In addition, the SRS transmission frequency band setting unit 112 outputs to the modulation and demodulation unit 107, the RRC Connection Setup message in which the parameter as well as the information on the center frequency of the SRS transmission frequency band is set.

The modulation and demodulation unit 107 performs encoding and modulation of the RRC Connection Setup message to obtain a baseband signal. The radio communication unit 106 converts the baseband signal to a downlink radio signal, and transmits the downlink radio signal through the antenna 108A to the antenna 108D.

Furthermore, during the communication of the serving radio terminal UE2-1, the SRS transmission frequency band setting unit 112 sets a parameter corresponding to the bandwidth of the SRS transmission frequency band, in SoundingRS-UL-Config, that is, the information element of an RRC Connection Reconfiguration message. Moreover, the SRS transmission frequency band setting unit 112 sets the information on the center frequency of the SRS transmission frequency band, in the RRC Connection Reconfiguration message.

In addition, the SRS transmission frequency band setting unit 112 outputs to the modulation and demodulation unit 107, the RRC Connection Reconfiguration message in which the parameter as well as the information on the center frequency of the SRS transmission frequency band is set.

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal through the antenna 108A to the antenna 108D.

The serving radio terminal UE2-1 receives the downlink radio signal corresponding to the RRC Connection Setup message, or the downlink radio signal corresponding to the RRC Connection Reconfiguration message.

Moreover, the serving radio terminal UE2-1 recognizes the bandwidth of the SRS transmission frequency band based on the parameter set in the RRC Connection Setup message, or the parameter set in the RRC Connection Reconfiguration message, as well as the parameter defined statically in correspondence to the cell 3-1. Furthermore, the serving radio terminal UE2-1 recognizes the center frequency of the SRS transmission frequency band based on the information on the center frequency of the SRS transmission frequency band that is set in the RRC Connection Setup message.

Based on the bandwidth of the SRS transmission frequency band as well as the center frequency of the SRS transmission frequency band, the serving radio terminal UE2-1 can uniquely identify the SRS transmission frequency band, and transmits the SRS by using the SRS transmission frequency band, at the timing of a special subframe.

The radio communication unit 106 of the radio base station eNB1-1 receives the SRS that is transmitted from the serving radio terminal UE2-1, through the antenna 108A to the antenna 108D. In addition, the radio communication unit 106 converts the received SRS to a baseband signal, and outputs the signal to the modulation and demodulation unit 107. Furthermore, the radio communication unit 106 outputs the information on the frequency band of the received SRS to the control unit 102. The modulation and demodulation unit 107 performs demodulation and decoding processes for the input baseband signal. In this way, the data included in the SRS transmitted by the radio terminal UE2-1 is obtained. The data is output to the control unit 102.

The RB assignment unit 114 assigns a downlink resource block to the serving radio terminal UE2-1. Specifically, the below-described first process through third process are performed.

(First Process)

If the frequency band of the SRS received most recently matches the SRS transmission frequency band defined for transmitting the SRS, the RB assignment unit 114 assigns all the downlink resource blocks included in the matching SRS transmission frequency band to the serving radio terminal UE2-1.

(Second Process)

Figure 6:
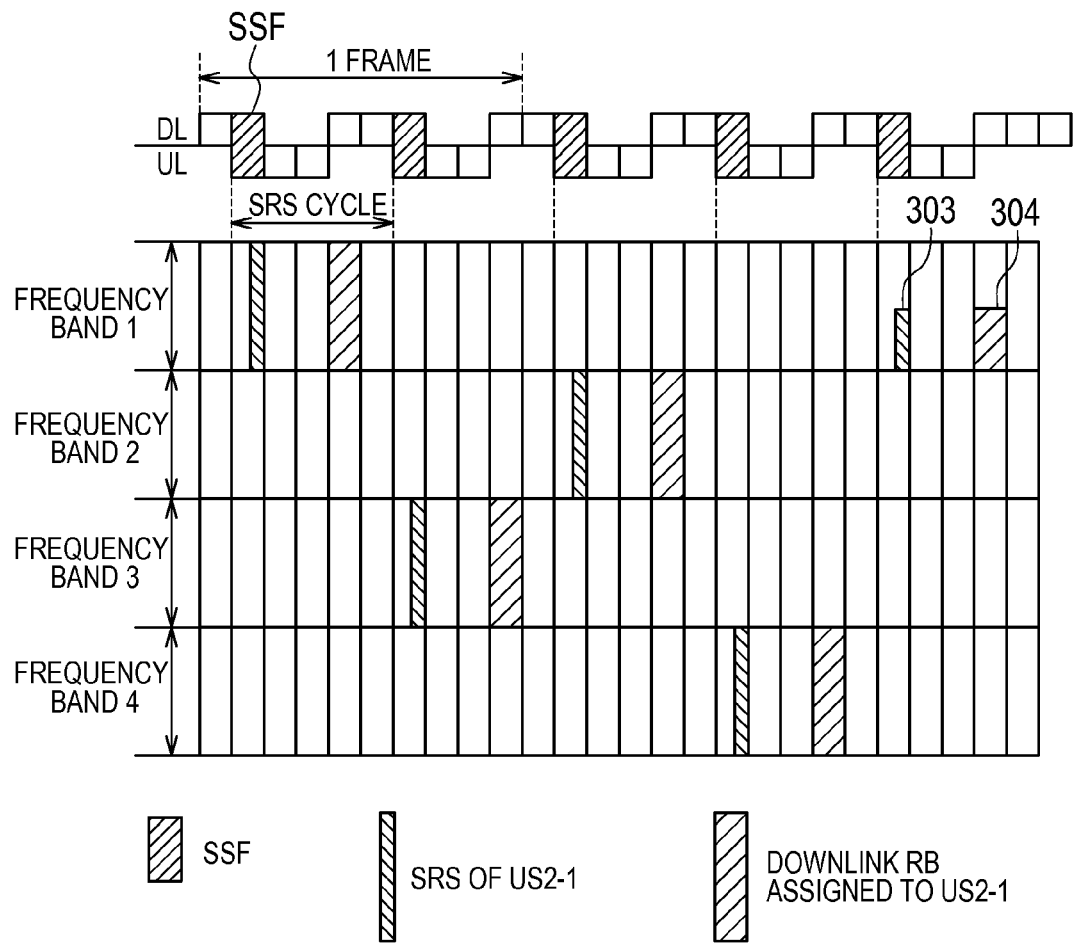
FIG. 6 is a diagram illustrating a first example of the correspondence between a frequency band of SRS and an assigned downlink resource block according to the embodiment of the present invention.

If the frequency band of the SRS received most recently is a part of the SRS transmission frequency band defined for transmitting the SRS, the RB assignment unit 114 assigns all the downlink resource blocks included in the frequency band of the SRS received most recently to the serving radio terminal UE2-1. For example, as illustrated in FIG. 6, when the SRS received at the timing of the special subframe 303 is a part of a frequency band 1, which is the SRS transmission frequency band, the RB assignment unit 114 assigns all the downlink resource blocks 304 included in the frequency band of the SRS received at the timing of the special subframe 303 to the serving radio terminal UE2-1.

(Third Process)

Figure 7:
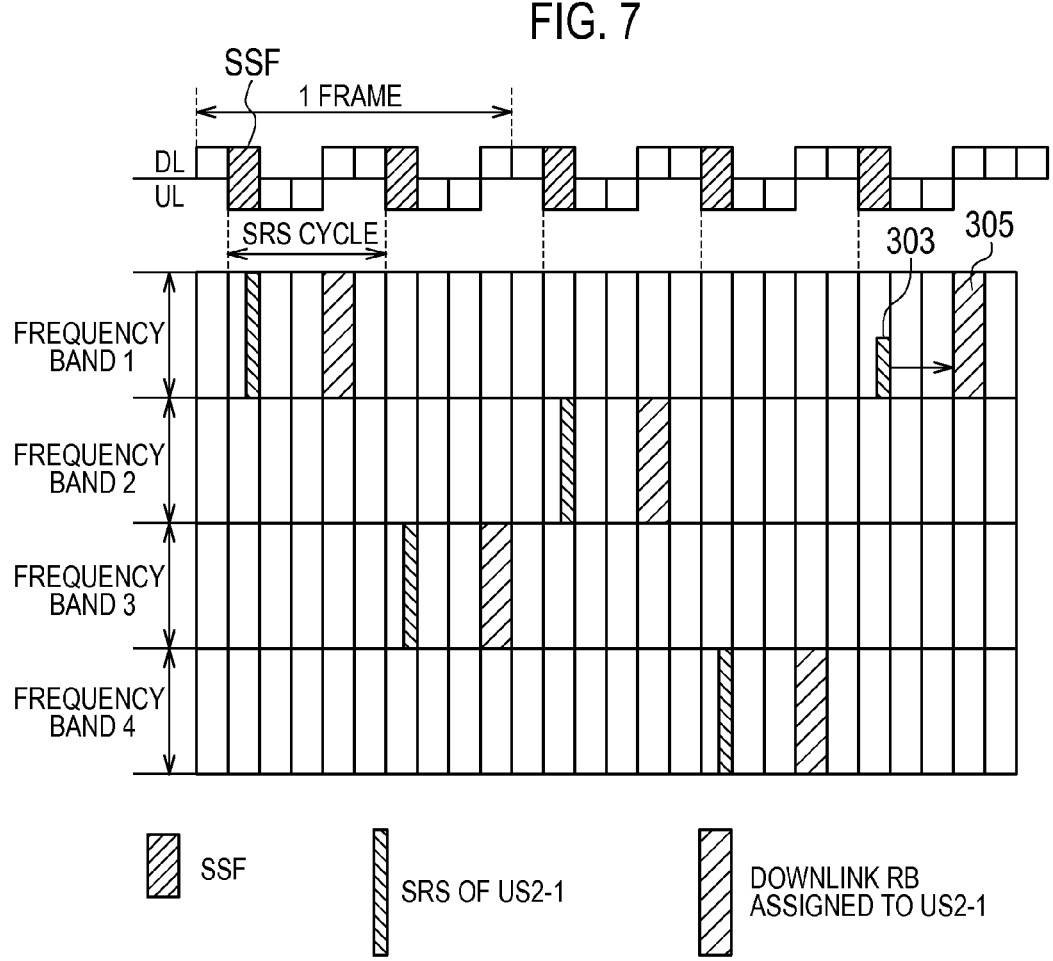
FIG. 7 is a diagram illustrating a second example of the correspondence between a frequency band of SRS and an assigned downlink resource block according to the embodiment of the present invention.

If the frequency band of the SRS received most recently is a part of the SRS transmission frequency band defined for transmitting the SRS, the third process may be performed in place of the second process. In the third process, the RB assignment unit 114 assigns, to the serving radio terminal UE2-1, the downlink resource blocks included in the SRS transmission frequency band that includes the frequency band of the SRS received most recently. For example, as illustrated in FIG. 7, when the SRS received at the timing of the special subframe 303 is a part of a frequency band 1, which is the SRS transmission frequency band, the RB assignment unit 114 assigns all the downlink resource blocks 305 included in the frequency band 1, which is the SRS transmission frequency band including the frequency band of the SRS received at the timing of the special subframe 303, to the serving radio terminal UE2-1.

After the aforementioned first process through third process, the RB assignment unit 114 determines the time period of the downlink resource block to be assigned. If the timing of receiving the most recent SRS is the timing of the first SSF, the RB assignment unit 114 determines the time period of at least any one of the subframes of the downlink resource blocks during the time period from the timing of the first SSF up to the timing of the second SSF. Furthermore, if the timing of receiving the most recent SRS is the timing of the second SSF, the RB assignment unit 114 determines the time period of at least one of the subframes of the downlink resource blocks during the time period from the timing of the second SSF up to the posterior-most point of the frame including the second SSF.

In addition, the RB assignment unit 114 generates a downlink RB assignment value that can uniquely identify a frequency band and a time period of the determined downlink resource block. The downlink RB assignment value is obtained by a process of a medium access control (MAC) layer. The downlink RB assignment value includes a resource block number indicating the information for uniquely identifying a time period and a frequency band of the downlink resource block assigned to the serving radio terminal UE2-1.

The RB assignment unit 114 transmits the downlink RB assignment value to the serving radio terminal UE2-1 through the modulation and demodulation unit 107, the radio communication unit 106, and the antenna 108A to the antenna 108D.

After the downlink resource block has been assigned by the RB assignment unit 114, the antenna weight calculation unit 116 calculates the antenna weight (a transmission weight) during the transmission of the downlink radio signal using the assigned downlink resource block, for each antenna 108A to the antenna 108D.

Specifically, the antenna weight calculation unit 116 identifies the frequency band of a downlink resource block assigned to the serving radio terminal UE2-1, based on the downlink RB assignment value generated by the RB assignment unit 114. Next, the antenna weight calculation unit 116 determines whether or not the frequency band of the SRS received most recently matches the frequency band of the assigned downlink resource block.

If the frequency band of the SRS received most recently matches the frequency band of the assigned downlink resource block, the antenna weight calculation unit 116 calculates the transmission weight in the frequency band of the assigned downlink resource block, based on the SRS received most recently. Then, the antenna weight calculation unit 116 calculates an antenna weight (a reception weight), at which a signal-to-interference noise ratio (SINR) at the time of reception of the SRS from the serving radio terminal UE2-1 is maximum, and sets the reception weight as the transmission weight.

The calculated reception weight of each of the antenna 108A to the antenna 108D is the antenna weight at which the SINR is the maximum at the time of reception of the uplink radio signal from the serving radio terminal UE2-1. Accordingly, the reception weights are set as the transmission weights, so that the transmission weights are antenna weights at which a desired wave direction of a beam is directed to the serving radio terminal UE2-1.

On the other hand, if the frequency band of the SRS received most recently does not match the frequency band of the assigned downlink resource block, in other words, if the above third process is performed by the RB assignment unit 114, then based on the SRS received most recently, the antenna weight calculation unit 116 calculates the reception weight for the overlapping portion between the frequency band of the SRS received most recently from the frequency band of the assigned downlink resource block, and the frequency band of the assigned downlink resource block, and sets the reception weight as the transmission weight.

Furthermore, the antenna weight calculation unit 116 calculates a non-directional transmission weight for a non-overlapping portion between the frequency band of the SRS received most recently from the frequency band of the assigned downlink resource block, and the frequency band of the assigned downlink resource block.

However, if the frequency band of the SRS received most recently does not match the frequency band of the assigned downlink resource block, and the non-overlapping portion between the frequency band of the SRS received most recently and the frequency band of the assigned downlink resource block is included in the frequency band of the SRS received within a predetermined time period of the past (for example, the time period of a single frame), then based on the SRS received within the predetermined time period of the past, the antenna weight calculation unit 116 calculates the reception weight in the non-overlapping portion between the frequency band of the SRS received most recently and the frequency band of the assigned downlink resource block, and sets the reception weight as the transmission weight.

Following that, the control unit 102 transmits the downlink radio signal to the serving radio terminal UE2-1, through the modulation and demodulation unit 107, the radio communication unit 106, and the antenna 108A to the antenna 108D, by using the assigned downlink resource block.

Furthermore, the control unit 102 monitors the reception level of the SRS from the serving radio terminal UE2-1 as the communication quality between the radio base station eNB1-1 and the serving radio terminal UE2-1. Moreover, if the reception level of the SRS is smaller than a predetermined range, the control unit 102 transmits a transmission power control message, which is an RRC message requesting an increase in the transmission power, to the serving radio terminal UE2-1, through the modulation and demodulation unit 107, the radio communication unit 106, and the antenna 108A to the antenna 108D. Furthermore, if the reception level of the SRS is larger than a predetermined range, the control unit 102 transmits a transmission power control message, which is an RRC message requesting a decrease in the transmission power, to the serving radio terminal UE2-1, through the modulation and demodulation unit 107, the radio communication unit 106, and the antenna 108A to the antenna 108D.

(3) Configuration of Radio Terminal

Figure 8:
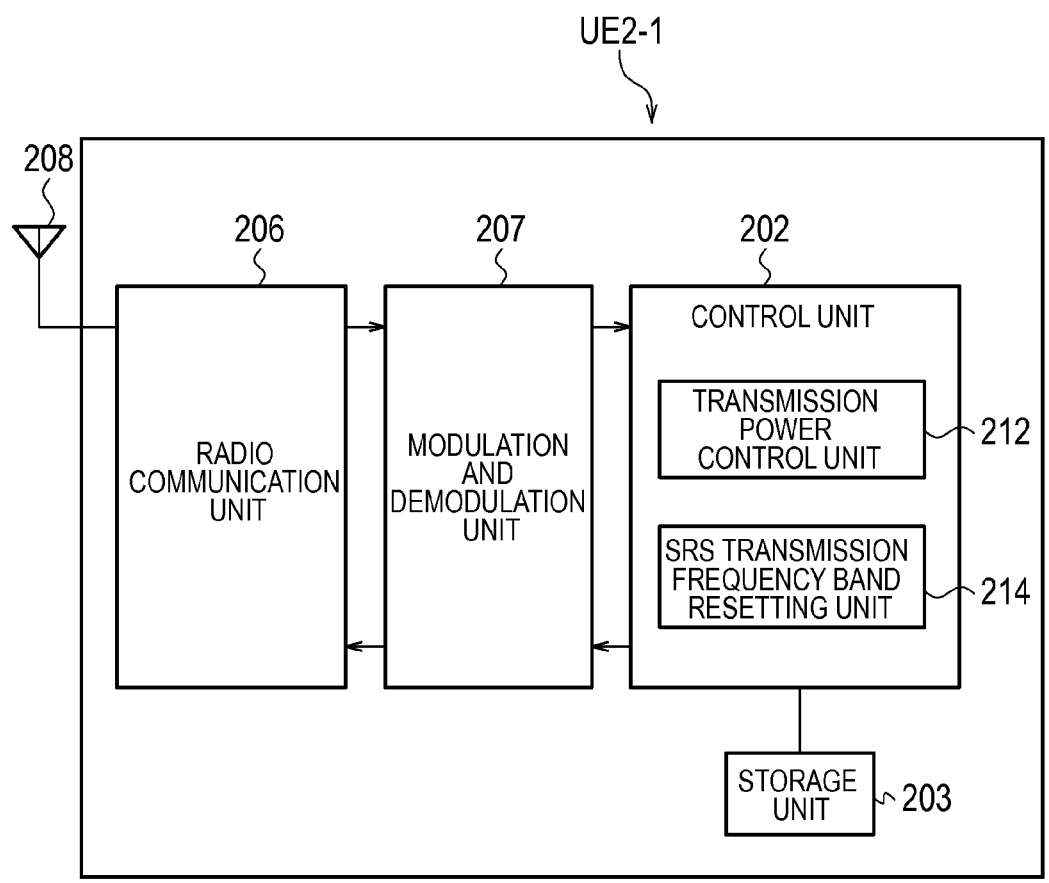
FIG. 8 is a configuration diagram of a radio terminal according to the embodiment of the present invention.

FIG. 8 is a configuration diagram of the serving radio terminal UE2-1. As illustrated in FIG. 8, the serving radio terminal UE2-1 includes a control unit 202, a storage unit 203, a radio communication unit 206, a modulation and demodulation unit 207, and an antenna 208.

The control unit 202, for example, is configured by a CPU, and controls various functions of the serving radio terminal UE2-1. The control unit 202 includes a transmission power control unit 212 and a sounding reference signal (SRS) transmission frequency band resetting unit 214. The storage unit 203, for example, is configured by a memory, and stores various types of information used for the control and the like of the serving radio terminal UE2-1.

The radio communication unit 206 receives a downlink radio signal transmitted from the radio base station eNB1-1 through the antenna 208. Moreover, the radio communication unit 206 converts (down-converts) the received downlink radio signal to a baseband signal, and outputs the baseband signal to the modulation and demodulation unit 207.

The modulation and demodulation unit 207 performs demodulation and decoding processes for the input baseband signal. In this way, the data included in the downlink radio signal transmitted by the radio base station eNB1-1 is obtained. The data is output to the control unit 202.

Furthermore, the modulation and demodulation unit 207 performs encoding and modulation of the data from the control unit 202 to obtain a baseband signal. The radio communication unit 206 converts (up-converts) the baseband signal to an uplink radio signal. Moreover, the radio communication unit 206 transmits the uplink radio signal through the antenna 208.

The control unit 202 receives an RRC Connection Setup message, or an RRC Connection Reconfiguration message including the information on the SRS transmission frequency band, corresponding to the downlink radio signal from the radio base station eNB1-1 through the antenna 208, the radio communication unit 206, and the modulation and demodulation unit 207.

Moreover, the control unit 202 recognizes the bandwidth of the SRS transmission frequency band based on the parameter set in the RRC Connection Setup message, or the parameter set in the RRC Connection Reconfiguration message, as well as the parameter defined statically in correspondence to the cell 3-1. Furthermore, the control unit 202 recognizes the center frequency of the SRS transmission frequency band based on the information on the center frequency of the SRS transmission frequency band that is set in the RRC Connection Setup message.

Also, when the downlink radio signal from the radio base station eNB1-1 is received, the transmission power control unit 212 of the control unit 202 determines whether a transmission power control message is included in the downlink radio signal, in other words, whether a transmission power control message is received.

When the transmission power control message is received, the transmission power control unit 212 determines whether the transmission power control message requests an increase in the transmission power, or requests a decrease in the transmission power.

If the transmission power control message requests an increase in the transmission power, the transmission power control unit 212 determines if the transmission power at the current point of time is a predetermined upper-limit value. If the transmission power at the current point of time is not the upper-limit value, the transmission power control unit 212 raises the transmission power in accordance with the transmission power control message.

On the other hand, if the transmission power at the current point of time is the upper-limit value, the transmission power cannot be increased any further. In such a case, the SRS transmission frequency band resetting unit 214 determines whether the SRS transmission frequency band can be narrowed. If the SRS transmission frequency band at the current point of time is a predetermined minimum unit (for example, the frequency band of four resource blocks), it is determined that the SRS transmission frequency band cannot be narrowed.

If the SRS transmission frequency band can be narrowed, the SRS transmission frequency band resetting unit 214 resets the SRS transmission frequency band so that the SRS transmission frequency band is narrowed. Specifically, the SRS transmission frequency band resetting unit 214 sets an SRS transmission frequency band that is included in the SRS transmission frequency band indicated by the RRC Connection Setup message or the RRC Connection Reconfiguration message from the radio base station eNB1-1, and that is narrower than the SRS transmission frequency band.

Following this, the control unit 202 transmits the SRS using the reset SRS transmission frequency band, at a timing of the special subframe, through the modulation and demodulation unit 207, the radio communication unit 206, and the antenna 208.

On the other hand, if the transmission power control message requests a decrease in the transmission power, the transmission power control unit 212 determines whether a narrowing of the SRS transmission frequency band is in progress at the current point of time. If a narrowing of the SRS transmission frequency band is not in progress at the current point of time, the transmission power control unit 212 decreases the transmission power in accordance with the transmission power control message.

On the other hand, if a narrowing of the SRS transmission frequency band is in progress at the current point of time, the SRS transmission frequency band resetting unit 214 resets the SRS transmission frequency band so that the SRS transmission frequency band is expanded. However, the SRS transmission frequency band resetting unit 214 ensures that the SRS transmission frequency band after expansion does not exceed the range of the SRS transmission frequency band indicated by the RRC Connection Setup message or the RRC Connection Reconfiguration message from the radio base station eNB1-1.

Alternatively, if a narrowing of the SRS transmission frequency band is in progress at the current point of time, the SRS transmission frequency band resetting unit 214 ends the process of narrowing the SRS transmission frequency band, and resets the SRS transmission frequency band. At this time, it is desired that the SRS transmission frequency band resetting unit 214 sets the frequency band that has the longest time period in which the frequency band is not used in the transmission of the SRS, from the entire frequency bands available in the radio communication between the radio base station eNB1-1 and the serving radio terminal UE2-1, as the SRS transmission frequency band.

Following this, the control unit 202 transmits the SRS using the reset SRS transmission frequency band, at a timing of the special subframe, through the modulation and demodulation unit 207, the radio communication unit 206, and the antenna 208.

(4) Operation of Radio Communication System

Figure 9:
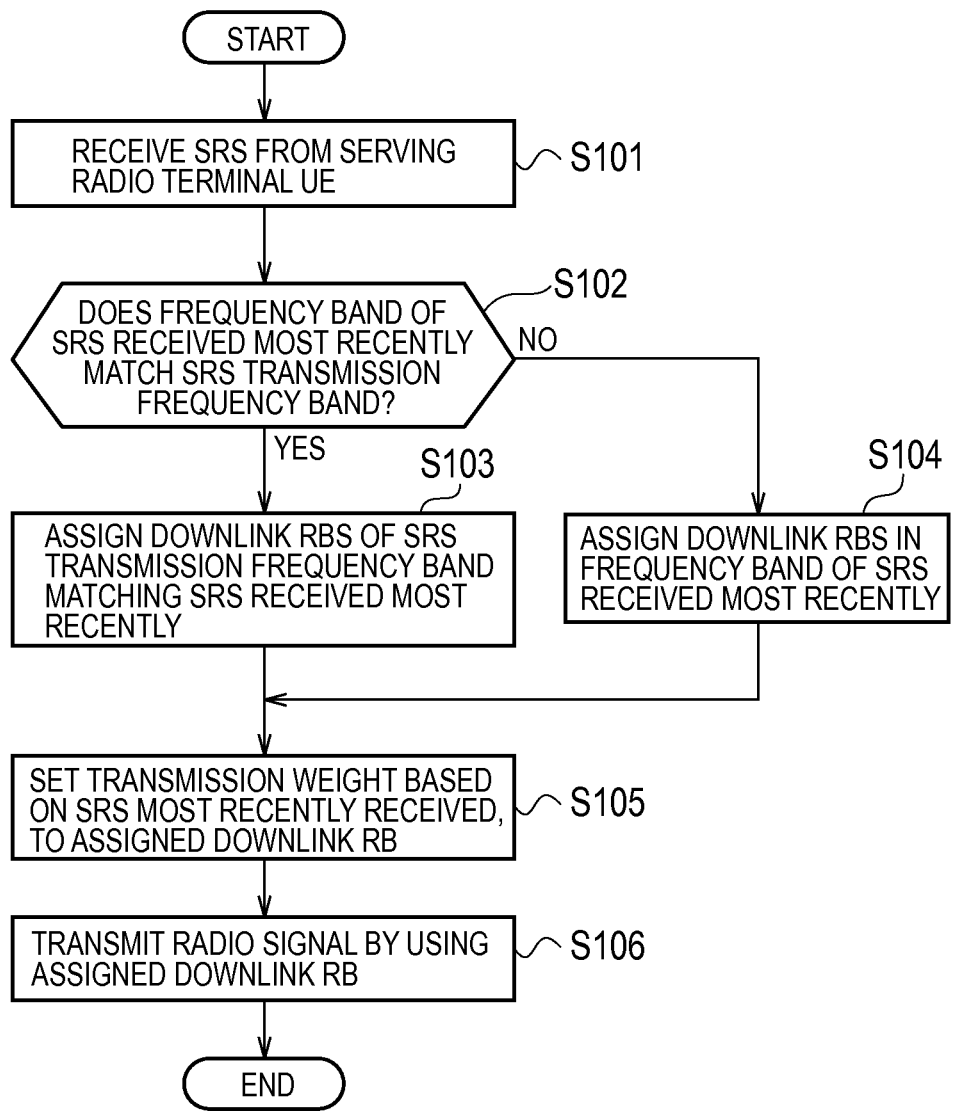
FIG. 9 is a flowchart illustrating a first operation of the radio base station according to the embodiment of the present invention.

FIG. 9 is a flowchart illustrating a first operation of the radio base station eNB1-1.

In step S101, the radio base station eNB1-1 receives SRS from the serving radio terminal UE2-1. In step S102, the radio base station eNB1-1 determines if the frequency band of the SRS received most recently matches the SRS transmission frequency band defined for transmitting the SRS.

If the frequency band of the SRS received most recently matches the SRS transmission frequency band defined for transmitting the SRS, then in step S103, the radio base station eNB1-1 assigns all the downlink resource blocks of the SRS transmission frequency band matching the frequency band of the SRS received most recently to the serving radio terminal UE2-1.

On the other hand, if the frequency band of the SRS received most recently does not match the SRS transmission frequency band defined for transmitting the SRS, in other words, if the frequency band of the SRS received most recently is a part of the SRS transmission frequency band defined for transmitting the SRS, then in step S104, the radio base station eNB1-1 assigns all the downlink resource blocks included in the frequency band of the SRS received most recently to the serving radio terminal UE2-1.

After the downlink resource block has been assigned in step S103 or step S104, the radio base station eNB1-1 sets a transmission weight, based on the SRS received most recently, for the assigned downlink resource block, in step S105.

In step S106, the radio base station eNB1-1 transmits a downlink radio signal by using the assigned downlink resource block.

Figure 10:
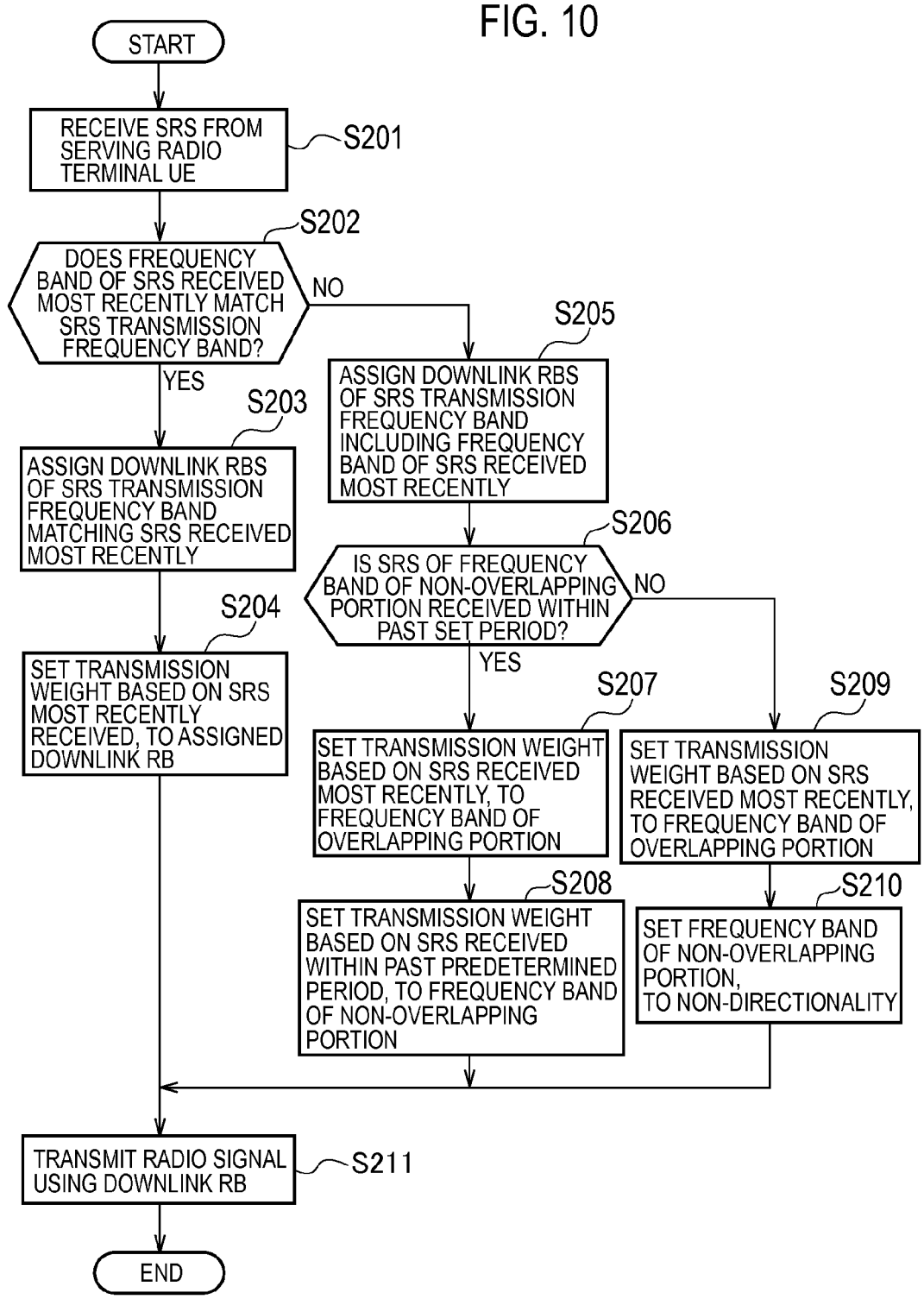
FIG. 10 is a flowchart illustrating a second operation of the radio base station according to the embodiment of the present invention.

FIG. 10 is a flowchart illustrating a second operation of the radio base station eNB1-1.

In step S201, the radio base station eNB1-1 receives SRS from the serving radio terminal UE2-1. In step S202, the radio base station eNB1-1 determines if the frequency band of the SRS received most recently matches the SRS transmission frequency band defined for transmitting the SRS.

If the frequency band of the SRS received most recently matches the SRS transmission frequency band defined for transmitting the SRS, then in step S203, the radio base station eNB1-1 assigns all the downlink resource blocks of the SRS transmission frequency band matching the frequency band of the SRS received most recently to the serving radio terminal UE2-1.

In step S204, the radio base station eNB1-1 sets a transmission weight, based on the SRS received most recently, for the assigned downlink resource block.

On the other hand, if the frequency band of the SRS received most recently does not match the SRS transmission frequency band defined for transmitting the SRS, then in step S205, the radio base station eNB1-1 assigns all the downlink resource blocks of the SRS transmission frequency band including the frequency band of the SRS received most recently to the serving radio terminal UE2-1.

In step S206, the radio base station eNB1-1 determines if SRS of a frequency band of a non-overlapping portion between the frequency band of the SRS received most recently from the frequency band of the assigned downlink resource block, and the frequency band of the assigned downlink resource block is received from the serving radio terminal UE2-1 within a predetermined time period of the past.

If the SRS of the frequency band of the non-overlapping portion is received from the serving radio terminal UE2-1 within a predetermined time period of the past, then in step S207, the radio base station eNB1-1 sets a transmission weight, based on the SRS received most recently, for a downlink resource block of the frequency band of the overlapping portion between the frequency band of the SRS received most recently from the frequency band of the assigned downlink resource block, and the frequency band of the assigned downlink resource block.

In step S208, the radio base station eNB1-1 sets a transmission weight, based on the SRS received within the predetermined time period of the past, for a downlink resource block of the frequency band of the non-overlapping portion between the frequency band of the SRS received most recently from the frequency band of the assigned downlink resource block, and the frequency band of the assigned downlink resource block.

On the other hand, if the SRS of the frequency band of the non-overlapping portion is not received from the serving radio terminal UE2-1 within a predetermined time period of the past, then in step S209, the radio base station eNB1-1 sets a transmission weight, based on the SRS received most recently, for a downlink resource block of the frequency band of the overlapping portion between the frequency band of the SRS received most recently from the frequency band of the assigned downlink resource block, and the frequency band of the assigned downlink resource block.

In step S210, the radio base station eNB1-1 sets a non-directional transmission weight for a downlink resource block of the frequency band of the non-overlapping portion between the frequency band of the SRS received most recently from the frequency band of the assigned downlink resource block, and the frequency band of the assigned downlink resource block.

After the setup of the transmission weight in step S204, step S208, and step S210, the radio base station eNB1-1 transmits a downlink radio signal using the assigned downlink resource block, in step S211.

Figure 11:
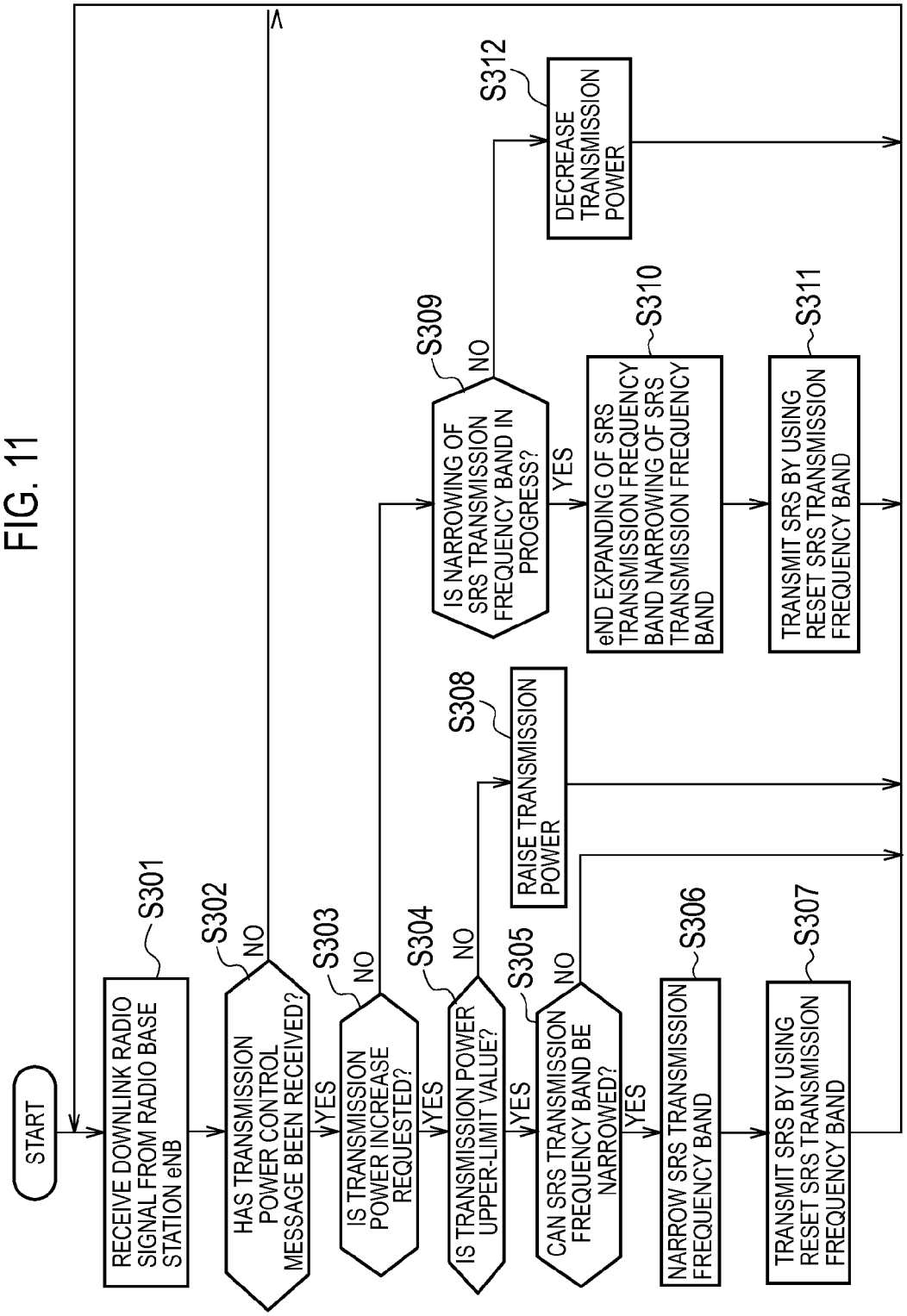
FIG. 11 is a flowchart illustrating an operation of the radio terminal according to the embodiment of the present invention.

FIG. 11 is a flowchart illustrating an operation of the serving radio terminal UE2-1.

In step S301, the serving radio terminal UE2-1 receives a downlink radio signal from the radio base station eNB1-1. In step S302, the serving radio terminal UE2-1 determines whether a transmission power control message is included in the received downlink radio signal, in other words, whether a transmission power control message is received.

When the transmission power control message is received, the serving radio terminal UE2-1 determines, in step S303, whether the transmission power control message requests an increase in the transmission power.

If the transmission power control message requests an increase in the transmission power, then in step S304, the serving radio terminal UE2-1 determines if the transmission power at the current point of time is a predetermined upper-limit value.

If the transmission power at the current point of time is the upper-limit value, then in step S305, the serving radio terminal UE2-1 determines if the SRS transmission frequency band can be narrowed.

If the SRS transmission frequency band can be narrowed, then in step S306, the serving radio terminal UE2-1 resets the SRS transmission frequency band so that the SRS transmission frequency band is narrowed. In step S307, the serving radio terminal UE2-1 transmits the SRS using the reset SRS transmission frequency band, at a timing of the special subframe.

On the other hand, if it is determined in step S304 that the transmission power at the current point of time is not the upper-limit value, then in step S308, the serving radio terminal UE2-1 raises the transmission power in accordance with the transmission power control message.

Furthermore, if it is determined in step S303 that the transmission power control message does not request an increase in the transmission power, in other words, the transmission power control message requests a decrease in the transmission power, then in step S309, the serving radio terminal UE2-1 determines whether a narrowing of the SRS transmission frequency band is in progress at the current point of time.

If a narrowing of the SRS transmission frequency band is in progress at the current point of time, then in step S310, the serving radio terminal UE2-1 resets the SRS transmission frequency band so that the SRS transmission frequency band is expanded. Alternatively, the serving radio terminal UE2-1 ends the process of narrowing the SRS transmission frequency band, and resets the SRS transmission frequency band.

In step S311, the serving radio terminal UE2-1 transmits the SRS using the reset SRS transmission frequency band, at a timing of the special subframe.

On the other hand, if it is determined in step S309 that a narrowing of the SRS transmission frequency band is not in progress at the current point of time, then in step S312, the serving radio terminal UE2-1 decreases the transmission power in accordance with the transmission power control message.

(5) Operation and Effect

As described above, according to the present embodiment, regardless of whether an SRS transmission frequency band is set, if the serving radio terminal UE2-1 transmits SRS by using only a part of the SRS transmission frequency band, the radio base station eNB1-1 assigns a downlink resource block having a frequency band of the SRS received most recently, from the SRS transmission frequency band, and sets a transmission weight, based on the SRS received most recently, for the downlink resource block, and also transmits a radio signal using the downlink resource block. Therefore, a transmission weight based on the SRS can be set for the downlink resource block having a frequency band of the SRS, and the setting of the transmission weight can be performed accurately.

Furthermore, the radio base station eNB1-1 assigns the downlink resource blocks having the SRS transmission frequency band, and from among the downlink resource blocks, the radio base station eNB1-1 sets a non-directional transmission weight for a downlink resource block having that other than the frequency band of the SRS received most recently. Furthermore, the radio base station eNB1-1 assigns the downlink resource blocks having the SRS transmission frequency band, and from among the downlink resource blocks, the radio base station eNB1-1 sets a transmission weight for a downlink resource block having a frequency band of SRS received within a predetermined time period of the past, based on the SRS received within the predetermined time period of the past, and also sets a non-directional transmission weight for a downlink resource block having a frequency band of the SRS that is not received within the predetermined time period of the past. Therefore, the setting of the transmission weight is performed accurately even when a downlink resource block other than the downlink resource block having a frequency band of the SRS received most recently is assigned.

Furthermore, in response to a request for an increase in the transmission power from the radio base station eNB1-1, the serving radio terminal UE2-1 narrows the SRS transmission frequency band if the transmission power is the upper-limit value. Thus, rather than increasing the entire transmission power, the serving radio terminal UE2-1 increases the transmission power of the SRS transmission frequency band.

Therefore, the transmission of SRS by the control of the SRS transmission frequency band according to the communication quality with the radio base station eNB (the reception level of a radio signal from a serving radio terminal UE2-1 in the radio base station eNB1-1) is made possible for the serving radio terminal UE2-1, and the certainty of arrival of the SRS to the radio base station eNB1-1 is improved.

Furthermore, in response to a request for a decrease in the transmission power from the radio base station eNB1-1, the serving radio terminal UE2-1 either expands the SRS transmission frequency band if a narrowing of the SRS transmission frequency band is in progress, or ends the process of narrowing the SRS transmission frequency band. Thus, the serving radio terminal UE2-1 can decrease the transmission power of the SRS.

(6) Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiments, the timing of the special subframe was used as the transmission timing of SRS in the serving radio terminal UE2-1. However, the transmission timing of the SRS is not limited thereto, and it is sufficient if the transmission timing is a timing agreed in advance between the radio base station eNB1-1 and the serving radio terminal UE2. However, it is preferable that the transmission timing of the SRS exists once in a time of at least one frame.

Furthermore, in the aforementioned embodiments, the radio base station eNB1-1 used the reception weight as the transmission weight. However, the transmission weight may be calculated independently of the reception weight.

In the aforementioned embodiments, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed.

Thus, it must be understood that the present invention includes various embodiments that are not described herein. Therefore, the present invention is limited only by the specific features of the invention in the scope of the claims reasonably evident from the disclosure above. In addition, the entire content of Japanese Patent Application No. 2010-191346 (filed on Aug. 27, 2010) and Japanese Patent Application No. 2010-191349 (filed on Aug. 27, 2010) is incorporated in the present specification by reference.

INDUSTRIAL APPLICABILITY

Firstly, according to the present invention, the setting of an antenna weight for a downlink radio resource can be performed accurately. Secondly, according to the present invention, the certainty of arrival of a reference signal to a radio base station can be improved.

The invention claimed is:

1. A radio base station of an adaptive array scheme applying an antenna weight to a plurality of antennas, comprising:
    a reception unit that receives a reference signal; and
    a control unit that sets a reference signal transmission frequency band available in a transmission of a reference signal from a serving radio terminal, the reference signal being referenced in the calculation of the antenna weight, and that also assigns a radio resource of the set reference signal transmission frequency band to the serving radio terminal, wherein
    the control unit sets an antenna weight to control beam directionality for a radio resource having a frequency band of the reference signal received by the reception unit most recently, from among the radio resources of the reference signal transmission frequency band, based on the reference signal received most recently, and
    the control unit sets the antenna weight so that a desired wave direction of a downlink beam having a frequency band of the reference signal, from the reference signal transmission frequency band, is directed towards the serving radio terminal.

2. The radio base station according to claim 1, wherein the control unit sets a non-directional antenna weight for the radio resource having a frequency band other than the frequency band of the reference signal, from the reference signal transmission frequency band.

3. The radio base station according to claim 1, wherein
the control unit sets the antenna weight so that a desired wave direction of a beam having a frequency band of the reference signal received within a predetermined time period, from the reference signal transmission frequency band, is directed towards the serving radio terminal.

4. The radio base station according to claim 1, wherein the control unit switches the reference signal transmission frequency band, at each timing of setting.

5. A communication control method in a radio base station of an adaptive array scheme applying an antenna weight to a plurality of antennas, comprising:
   a control step of setting a reference signal transmission frequency band available in a transmission of a reference signal from a serving radio terminal, the reference signal being referenced in the calculation of the antenna weight, and of assigning a radio resource of the set reference signal transmission frequency band to the serving radio terminal, wherein
   the control step includes a step of setting an antenna weight to control beam directionality for a radio resource having a frequency band of a reference signal received most recently, from among the radio resources of the reference signal transmission frequency band, based on the reference signal received most recently, and
   the control step includes a step of setting the antenna weight so that a desired wave direction of a downlink beam having a frequency band of the reference signal, from the reference signal transmission frequency band, is directed towards the serving radio terminal.

6. A radio terminal that performs radio communication with a radio base station of an adaptive array scheme applying an antenna weight to a plurality of antennas so as to control beam directionality, comprising:
   a reception unit that receives information on a first reference signal transmission frequency band available in a transmission of a reference signal referenced in the calculation of the antenna weight, and
   a control unit that sets a second reference signal transmission frequency band included in the first reference signal transmission frequency band, based on a communication quality with the radio base station, and transmits the reference signal using the second reference signal transmission frequency band, wherein
   the reference signal is used for the radio base station setting the antenna weight so that a desired wave direction of a transmitted downlink beam is directed towards the radio terminal.

7. The radio terminal according to claim 6, wherein the control unit sets the second reference signal transmission frequency band in accordance with a transmission power of the radio terminal.

8. The radio terminal according to claim 6, wherein
   the control unit narrows the second reference signal transmission frequency band when the transmission power control information requesting a control of the transmission power from the radio base station indicates a request for an increase of the transmission power, and either expands the second reference signal transmission frequency band or ends the process of narrowing of the second reference signal transmission frequency band when the transmission power control information requests a decrease in the transmission power.

9. A communication control method for a radio terminal and a radio base station of an adaptive array scheme applying an antenna weight to a plurality of antennas so as to control beam directionality, to perform radio communication, wherein
   the radio terminal receives information on a first reference signal transmission frequency band available in a transmission of a reference signal referenced in the calculation of the antenna weight,
   the radio terminal sets a second reference signal transmission frequency band included in the first reference signal transmission frequency band, based on a communication quality with the radio base station, and then transmits the reference signal using the second reference signal transmission frequency band, and
   the radio base station sets an antenna weight for a radio resource having a second reference signal frequency band of a reference signal received most recently, from among the radio resources of the first reference signal transmission frequency band, based on the reference signal received most recently, so that a desired wave direction of a downlink beam having the second reference signal frequency band is directed towards the radio terminal.

\* \* \* \* \*